United States Patent
Shi et al.

(10) Patent No.: US 11,347,614 B2
(45) Date of Patent: May 31, 2022

(54) MODIFYING COMPILED APPLICATIONS TO MONITOR PERFORMANCE

(71) Applicant: International Business Machines Corporation, Armonk, NY (US)

(72) Inventors: Yanfeng Shi, Beijing (CN); Guanqin Zhang, Beijing (CN); Yue Wang, Beijing (CN); Hui Gao, Beijing (CN); Yue Chen, Beijing (CN); Huai Nan Zhou, Beijing (CN); Hai Jun Xu, Beijing (CN); Wei ming He, Dong Hai/Lian Yun Gang (CN)

(73) Assignee: International Business Machines Corporation, Armonk, NY (US)

(*) Notice: Subject to any disclaimer, the term of this patent is extended or adjusted under 35 U.S.C. 154(b) by 262 days.

(21) Appl. No.: 16/780,062

(22) Filed: Feb. 3, 2020

(65) Prior Publication Data

US 2021/0240590 A1    Aug. 5, 2021

(51) Int. Cl.
*G06F 11/30* (2006.01)
*G06F 11/34* (2006.01)
(Continued)

(52) U.S. Cl.
CPC ...... *G06F 11/3409* (2013.01); *G06F 11/3006* (2013.01); *H04L 29/08549* (2013.01);
(Continued)

(58) Field of Classification Search
None
See application file for complete search history.

(56) References Cited

U.S. PATENT DOCUMENTS 6,266,681 B1    7/2001   Guthrie
7,137,105 B2    11/2006  Madsen et al.
(Continued)

OTHER PUBLICATIONS

G. Reisinger, Dynatrace Blog, "Full code-level visibility now available for Go-application monitoring", Oct. 2, 2019, https://www.dynatrace.com/news/blog.full-code-level-visibility-now-available-for-go-application-monitoring/, 15 pages.
New Relic APM, https://newrelic.com/products/application-monitoring, 5 pages.
Grace Period Disclosure, "IBM Cloud App Management V2019.4.0 December release—Application Performance Management", Dec. 20, 2019, https://developer.ibm.com/apm/2019/12/20/ibm-cloud-app-management-v2019-4-0-december-release/, 6 pages.
(Continued)

*Primary Examiner* — Anh Nguyen
(74) *Attorney, Agent, or Firm* — Edell, Shapiro & Finnan, LLC

(57) ABSTRACT

A computer system modifies a compiled application to monitor performance. A request routing function of the compiled application is replaced with jump code that directs processing to a data collection function and backing up the request routing function. In response to receiving, during execution of the compiled application, an incoming request from a remote device for handling by the request routing function, the data collection function is executed based on the jump code. Using the data collection function, data associated with the incoming request is collected, the data comprising performance metrics. The backup of the request routing function is called using the data collection function to process the request and provide a response. Embodiments of the present invention further include a method and program product for modifying a compiled application to monitor performance in substantially the same manner described above.

17 Claims, 4 Drawing Sheets

(51) Int. Cl.
   *H04L 67/1097* (2022.01)
   *H04L 43/0876* (2022.01)
   *H04L 43/0823* (2022.01)
   *H04L 43/04* (2022.01)

(52) U.S. Cl.
   CPC .......... *H04L 43/04* (2013.01); *H04L 43/0823* (2013.01); *H04L 43/0876* (2013.01)

(56) References Cited

U.S. PATENT DOCUMENTS

| | | | |
|---|---|---|---|
| 9,483,283 | B1 | 11/2016 | Hua et al. |
| 11,016,743 | B2 * | 5/2021 | Pizlo ........................ G06F 8/443 |
| 2012/0167057 | A1 | 6/2012 | Schmich et al. |
| 2014/0344345 | A1 | 11/2014 | Venkatraman et al. |
| 2016/0026452 | A1 * | 1/2016 | Dani ......................... G06F 8/65 717/170 |
| 2018/0091517 | A1 * | 3/2018 | Fury Christ .......... H04L 63/104 |

OTHER PUBLICATIONS

Grace Period Disclosure, User's Guide, "IBM Cloud APP Management Version 2019 Release 4", pp iii-188, 200 pages.
Grace Period Disclosure, User's Guide, "IBM Cloud APP Management Version 2019 Release 4", pp. 189-388, 200 pages.
Grace Period Disclosure, User's Guide, "IBM Cloud APP Management Version 2019 Release 4", pp. 389-588, 200 pages.
Grace Period Disclosure, User's Guide, "IBM Cloud APP Management Version 2019 Release 4", pp. 589-788, 200 pages.
Grace Period Disclosure, User's Guide, "IBM Cloud APP Management Version 2019 Release 4", pp. 789-988, 200 pages.
Grace Period Disclosure, User's Guide, "IBM Cloud APP Management Version 2019 Release 4", pp. 989-1188, 200 pages.
Grace Period Disclosure, User's Guide, "IBM Cloud APP Management Version 2019 Release 4", pp. 1189-1388, 200 pages.
Grace Period Disclosure, User's Guide, "IBM Cloud APP Management Version 2019 Release 4", pp. 1389-1404, 18 pages.

* cited by examiner

MODIFYING COMPILED APPLICATIONS TO MONITOR PERFORMANCE

STATEMENT REGARDING PRIOR DISCLOSURES BY THE INVENTOR OR A JOINT INVENTOR (IF APPLICABLE)

The following disclosure(s) are submitted under 35 U.S.C. § 102(b)(1)(A): DISCLOSURE(S): "IBM Cloud App Management Version 2019 Release 4," Dec. 13, 2019, pages 2-3, 56, and 560-566; "IBM Cloud App Management V2019.4.0 December release," Susham Patil, Dec. 20, 2019.

BACKGROUND

1. Technical Field

Present invention embodiments relate to monitoring performance of network software applications, and more specifically, to modifying compiled applications to intercept data relating to computing performance of serving requests.

2. Discussion of the Related Art

A network software application refers to an application that utilizes a network such as the Internet to perform useful functions, such as responding to requests from clients applications. One example of a network software application is a web application, which is a client-server computer program in which a web browser or other client application provides requests to a server-side application in order to process and receive data, etc. In order to track the performance of a network software application, statistics such as latency, data upload and download rates, and error rates may be requested. However, some applications may not inherently include functions for obtaining such statistics, making tracking of performance difficult.

SUMMARY

According to one embodiment of the present invention, a computer system modifies a compiled application to monitor performance. A request routing function of the compiled application is replaced with jump code that directs processing to a data collection function and backing up the request routing function. In response to receiving, during execution of the compiled application, an incoming request from a remote device for handling by the request routing function, the data collection function is executed based on the jump code. Using the data collection function, data associated with the incoming request is collected, the data comprising performance metrics. The backup of the request routing function is called using the data collection function to process the request and provide a response. Embodiments of the present invention further include a method and program product for modifying a compiled application to monitor performance in substantially the same manner described above.

BRIEF DESCRIPTION OF THE DRAWINGS

Generally, like reference numerals in the various figures are utilized to designate like components.

DETAILED DESCRIPTION

Figure 1:
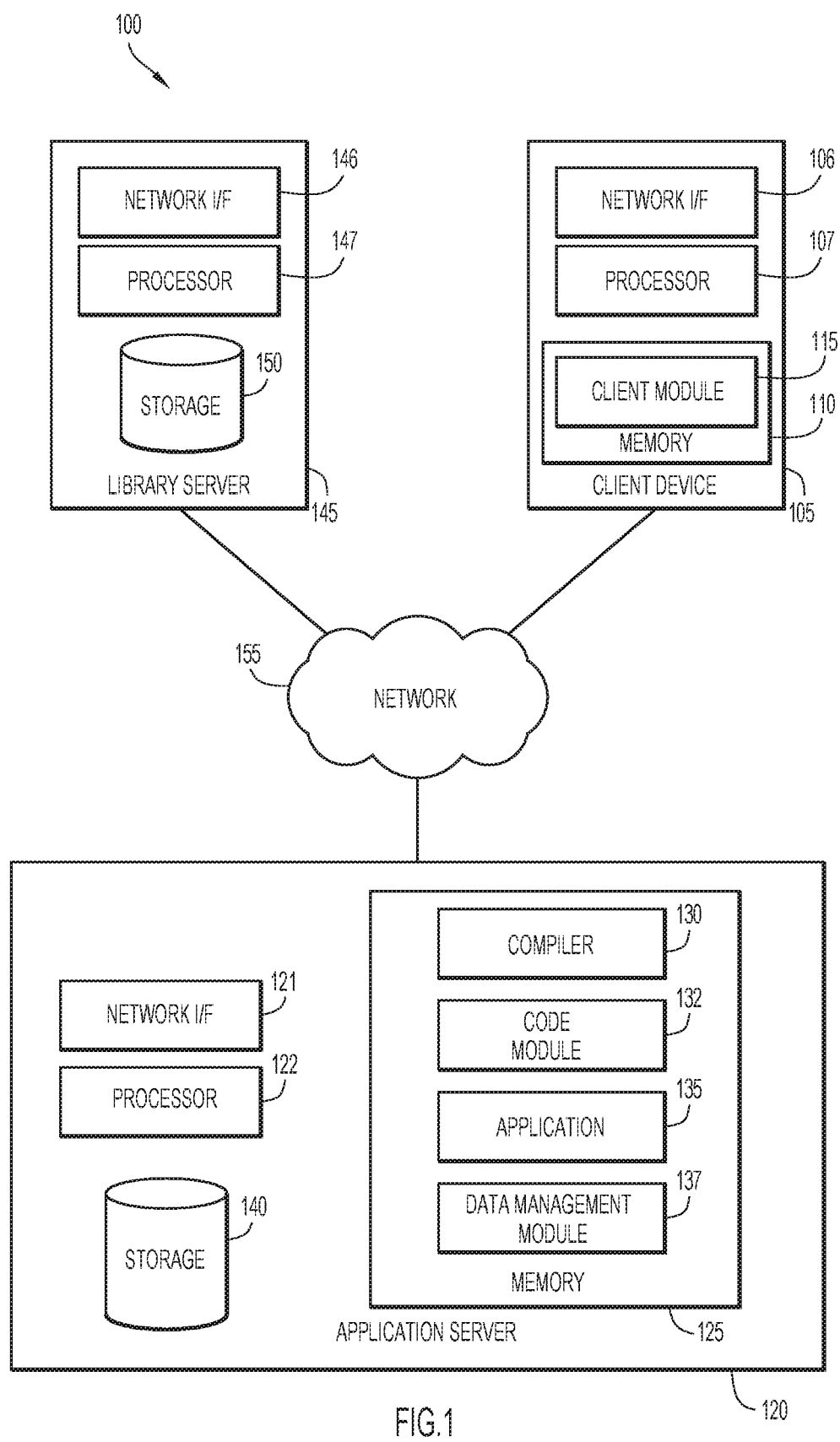
FIG. 1 is a block diagram depicting a computing environment for modifying compiled applications to monitor performance in accordance with an embodiment of the present invention.

Present invention embodiments relate to monitoring performance of network software applications, and more specifically, to modifying compiled applications to intercept data relating to computing performance of serving requests. A network software application, such as a web application, may be hosted on a server and may respond to requests received from client applications, such as HyperText Transfer Protocol (HTTP) requests and the like. In order to track or monitor the performance of an application, statistics relating to the application's performance may be collected, including latency, upload and download rates, and error rates. Typically, products that monitor the performance of applications will obtain performance metrics by intercepting some function call that is called whenever a request is received from a client. For example, Java™ and Python® provide hooks that can be used to obtain performance metrics in this manner.

However, in some programming languages, such as Go, when an application is compiled into a binary file, there may not be a mechanism for intercepting function calls. Existing solutions require a binary file to be dynamically linked, which is less efficient and less portable than static linking, since dynamic linking requires the presence of a library on the local system hosting the application. Moreover, existing solutions may require inclusion of a symbol table, which can introduce vulnerabilities to applications.

Present invention embodiments monitor performance by modifying the machine code of compiled applications to enable monitoring of requests and responses without requiring manual code instrumentation. In particular, a request routing function that is responsible for handling incoming requests is identified in a compiled application and replaced with a branch or jump command or code that can be configured to call or jump to any arbitrary function. The request routing function is backed up elsewhere in memory, and a data collection function is inserted into the application library. When the application receives a request, the request is initially handled by the jump code instead of the request routing function; the jump code calls the data collection function to initiate collection of data, and the data collection function then calls the backup copy of the request routing function so that the application can respond to the request. Thus, present invention embodiments enable collection of data, including performance metrics, from a compiled application by modifying the application in a manner that does not impact the functionality of the application.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for modifying compiled applications to monitor performance in accordance with an embodiment of the present invention. As depicted, computing environment 100 includes a client device 105, an application server 120, a library server 145, and a network 155. It is to be understood that the functional division among components of computing environment 100 have been chosen for purposes of explaining present invention embodiments and is not to be construed as a limiting example.

Client device 105 includes a network interface (I/F) 106, at least one processor 107, and memory 110 that includes a client module 115. Client device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client device 105 to send and receive data over a network, such as network 155. In general, client device 105 sends requests for data, which application server 120 handles by processing requests and replying with responses. Client device 105 may include internal and external hardware components, as depicted and described in further detail with respect to FIG. 4.

Client module 115 may include one or more modules or units to perform various functions of present invention embodiments described below. Client module 115 may be implemented by any combination of any quantity of software and/or hardware modules or units, and may reside within memory 110 of client device 105 for execution by a processor, such as processor 107.

Client module 115 may transmit data to and from network applications, such as application 135 of application server 120. In particular, client module 115 may transmit a request to a network application, which can process the request (e.g., by generating data, fetching data, etc.) and send a response back to client module 115. In some embodiments, client module 115 is a web client, such as a web browser or other application, and the requests and responses can include HyperText Transfer Protocol (HTTP) and/or HyperText Transfer Protocol Secure (HTTPS) requests and responses. For example, client module 115 may send a request to application 135 to request a particular web page to be transmitted to client module 115. Additionally or alternatively, a user of client device 105 may input data to client module 115 that can be included in a request sent to application 135 for processing. Client module 115 may include a user interface, such as a graphical user interface, for presenting data to a user of client device 105 and/or obtaining input from a user of client device 105.

Application server 120 includes a network interface (I/F) 121, at least one processor 122, and memory 125. Memory 125 may include a compiler 130, a code module 132, an application 135, and a data management module 137. Application server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of application server 120 to send and receive data over a network, such as network 155. In general, application server 120 hosts one or more applications (e.g., application 135) that can respond to requests received from client applications (e.g., client module 115) via a network (e.g., network 155). Moreover, application server 120 may intercept data from hosted applications in order to obtain performance metrics. Application server 120 may include internal and external hardware components, as depicted and described in further detail with respect to FIG. 4.

Compiler 130, code module 132, application 135, and/or data management module 137 may include one or more modules or units to perform various functions of present invention embodiments described below. Compiler 130, code module 132, application 135, and/or data management module 137 may be implemented by any combination of any quantity of software and/or hardware modules or units, and may reside within memory 125 of application server 120 for execution by a processor, such as processor 122.

Compiler 130 may include any known or other computer program for translating code from one programming language into another. In particular, compiler 130 may translate source code of a high-level programming language into a lower-level programming language (e.g., assembly language, object code, and/or machine code) to create an executable program. In some embodiments, compiler 130 compiles source code in the Go programming language into an executable program. Compiler 130 may import packages from one or more sources, such as storage 140 of application server 120 and/or storage 150 of library server 145, for including additional code in an application during compilation.

Code module 132 is a module that automatically modifies applications in order to monitor performance. Code module 132 may modify machine code of application 135 in accordance with present invention embodiments in order to, e.g., insert jump code, back up a request routing function, insert a data collection function, and the like. Code module 132 may automatically modify application 135 prior to execution, such as at start-up or initialization.

Application 135 is a server-side application that receives requests from client applications (e.g., client module 115), processes requests, and responds to the requests. Application 135 may include any compiled application, and may be compiled by compiler 130 or another compiler; in some embodiments, application 135 is a compiled Go application. Application 135 may be modified as a result of importing a package such that data may be intercepted from application 135 during runtime. In particular, application 135 may contain code that causes application 135 to be modified during initialization such that performance metrics can be obtained from application 135 during runtime. Application 135 is depicted and described in further detail below with respect to FIG. 2.

Data management module 137 may obtain, manage, and/or share data intercepted from application 135, including data relating to the performance of application 135. In particular, data management module 137 may manage data pertaining to latency, upload and download speeds, error rates, and any other network statistics indicative of the performance of application 135. Data management module 137 may transmit data collected about the performance of applications to one or more external entities via network 155 and/or may store the data in persistent storage (e.g., in storage 140). Thus, data intercepted from applications may be stored and/or shared for purposes such as diagnosing network issues, troubleshooting applications, and the like.

Storage 140 may include any non-volatile storage media known in the art. For example, storage 140 can be implemented with a tape library, optical library, one or more independent hard disk drives, or multiple hard disk drives in a redundant array of independent disks (RAID). Similarly, data in storage 140 may conform to any suitable storage architecture known in the art, such as a file, a relational database, an object-oriented database, and/or one or more tables. In some embodiments, storage 140 may store data relating to the performance of applications executing on application server 120, including data pertaining to latency, upload and download speeds, error rates, and other network statistics. Performance metrics stored in storage 140 may be stored as time-series data. Additionally or alternatively, storage 140 may include any packages imported from external sources, such as storage 150 of library server 145.

Library server 145 includes a network interface (I/F) 146, at least one processor 147, and storage 150. Library server 145 may each include a laptop computer, a tablet computer, a netbook computer, a personal computer (PC), a desktop computer, a personal digital assistant (PDA), a smart phone, or any programmable electronic device capable of executing computer readable program instructions. Network interface 146 enables components of library server 145 to send and receive data over a network, such as network 155. In general, library server 145 hosts packages that can be imported into applications during compilation. Library server 145 may include internal and external hardware components, as depicted and described in further detail with respect to FIG. 4.

Storage 150 may include any non-volatile storage media known in the art. For example, storage 150 can be implemented with a tape library, optical library, one or more independent hard disk drives, or multiple hard disk drives in a redundant array of independent disks (RAID). Similarly, data in storage 150 may conform to any suitable storage architecture known in the art, such as a file, a relational database, an object-oriented database, and/or one or more tables. Storage 150 may store any data, including packages that can be imported into applications during compilation. In particular, storage 150 may include a package that contains instructions for generating a jump command or code in an application compiled by a compiler, as well as instructions for inserting the jump command or code in a place of a request routing function of an application, generating a backup of the request routing function, and inserting a data collection function.

Network 155 may include a local area network (LAN), a wide area network (WAN) such as the Internet, or a combination of the two, and includes wired, wireless, or fiber optic connections. In general, network 155 can be any combination of connections and protocols known in the art that will support communications between client device 105, application server 120, and/or library server 145 via their respective network interfaces in accordance with embodiments of the present invention.

Figure 2:
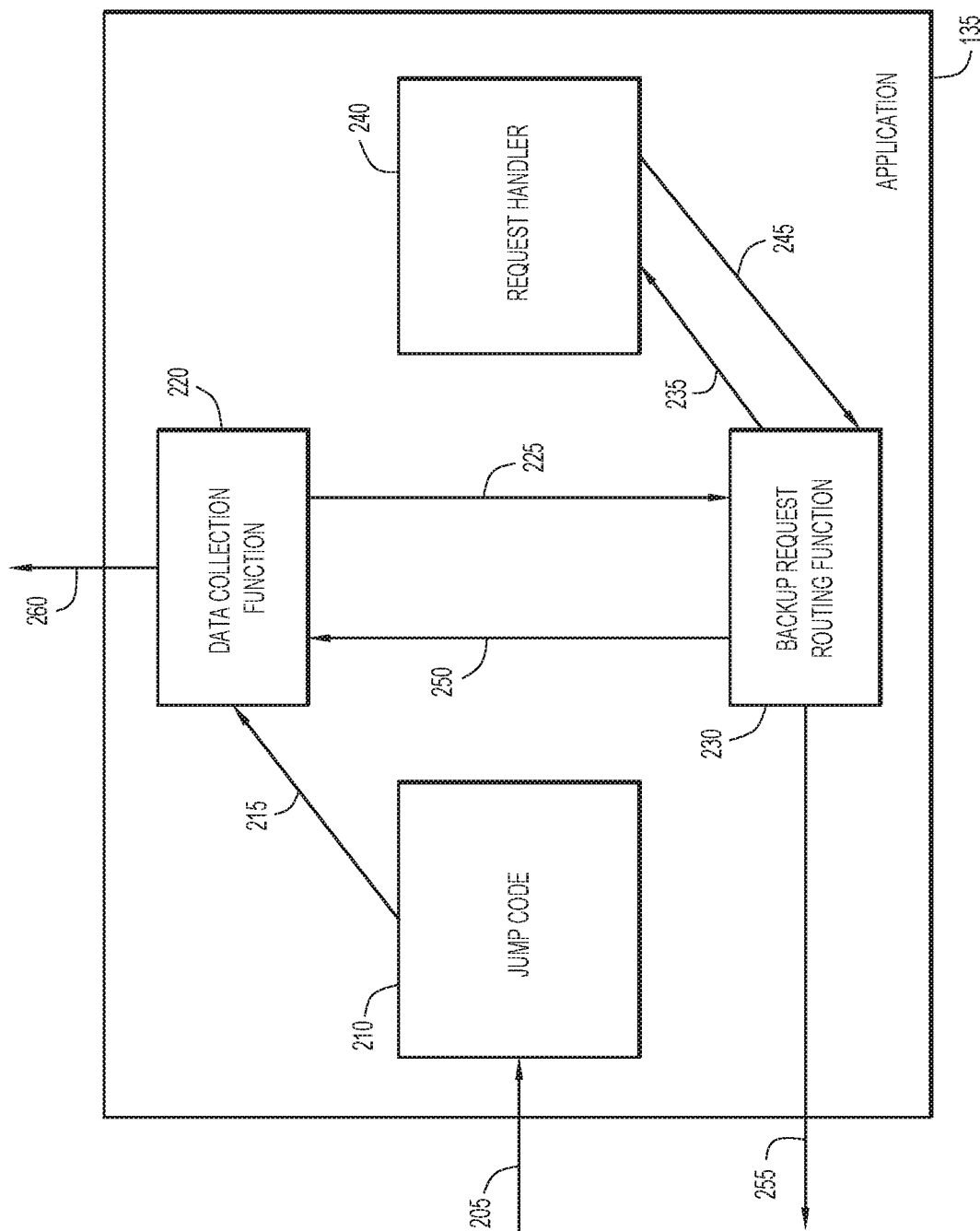
FIG. 2 is a block diagram depicting an application that is modified in order to monitor performance in accordance with an embodiment of the present invention.

FIG. 2 is a block diagram depicting an application 135 that is modified in order to monitor performance in accordance with an embodiment of the present invention. As depicted, application 135 includes a jump code 210, a data collection function 220, a backup request routing function 230, and a request handler 240.

In one embodiment, a request 205 is received by application 135 and is initially handled by jump code 210, which calls or jumps to data collection function 220 at operation 215. Data collection function 220 collects data relating to the request and calls backup request routing function 230 at call 225 so that request 205 can be served. Backup request routing function 230 identifies and calls the appropriate handler, request handler 240, which is called at call 235. It should be appreciated that application 135 may include multiple handlers for various requests (e.g., a handler for HTTP and/or HTTPS requests, a handler for File Transfer Protocol (FTP) requests, a handler for requests for certain data types, etc.), and that request handler 240 is selected by backup request routing function 230 as the appropriate handler for request 205. Request handler 240 provides data that is requested by request 205 to backup request routing function 230 via call 245, and additional data relating to the processing of request 205 is shared to data collection function at call 250. Application 135 transmits response 255, which is a response to request 205 (e.g., containing data generated and/or obtained by request handler 240), to the client that transmitted requested 205 (e.g., client module 115 of client device 105).

Application 135 is modified at compilation by importing a package that causes compiler 130 to convert the original request routing function from a private function to a public function. Whereas a private function can only be called by a parent function, a public function can be called by other functions, so converting the original request routing function to a public function enables the original request routing function to be located and backed up to another location in memory when compiled application 135 is executing. The original request routing function may be responsible for routing incoming requests (e.g., request 205) to a handler function (e.g., request handler 240). Jump code 210 and data collection function 220 may also be included in the imported package for insertion into application 135 during compilation.

In some embodiments, the request routing function is converted to a public function by a compile directive. For example, in the Go programming language, the directive "//go:linkname ServeHTTP net/http.serverHandler.ServeHTTP" instructs the compiler to use "net/http.serverHandler.ServeHTTP" as the object file symbol name for the variable or function declared as "ServeHTTP" in the source code.

When compiled application 135 is initialized, the machine code of the request routing function, now a public function, is copied to another location in memory to create backup request routing function 230, and the original request routing function is replaced by jump code 210. In particular, the request routing function's machine code may be copied to a large predefined function in memory. In some embodiments, backup request routing function 230 is inserted into a memory space within data collection function 220 that was previously reserved by a space hold function. In some embodiments, the addresses of RIP register-related operation instructions may be modified due to the instruction-relative addressing modes of 64-bit architecture.

While initializing compiled application 135, the memory of the public request routing function is made writeable and executable. A programming language-specific command may be executed to change access protections for the memory of the public request routing function. For example, in the Go programming language, "syscall.Mprotect" is called to change protections for the memory of the public request routing function. Next, the request routing function, now public, writeable, and executable, is replaced by jump code 210, and the memory of jump code 210 is made readable and executable. Request handler 240 is loaded into memory along with other functions (such as other handlers, etc.) of application 135 to complete initialization of application 135.

Thus, during execution of application 135, request 205 is initially intercepted by jump code 210, since jump code 210 occupies the memory space previously occupied by the original request routing function. Jump code 210 jumps to data collection function 220 at operation 215, which intercepts data relating to request 205 (e.g., performance metrics) before request 205 is passed to backup request routing function 230 and request handler 240. Data collection function 220 may also intercept, at call 250, data relating to request 205 after request 205 is processed by request handler 240 (i.e. data relating to response 255). Data collection function 220 may share data relating to request 205 and/or response 255 with one or more destinations (e.g., data management module 137), depicted at 260.

Figure 3:
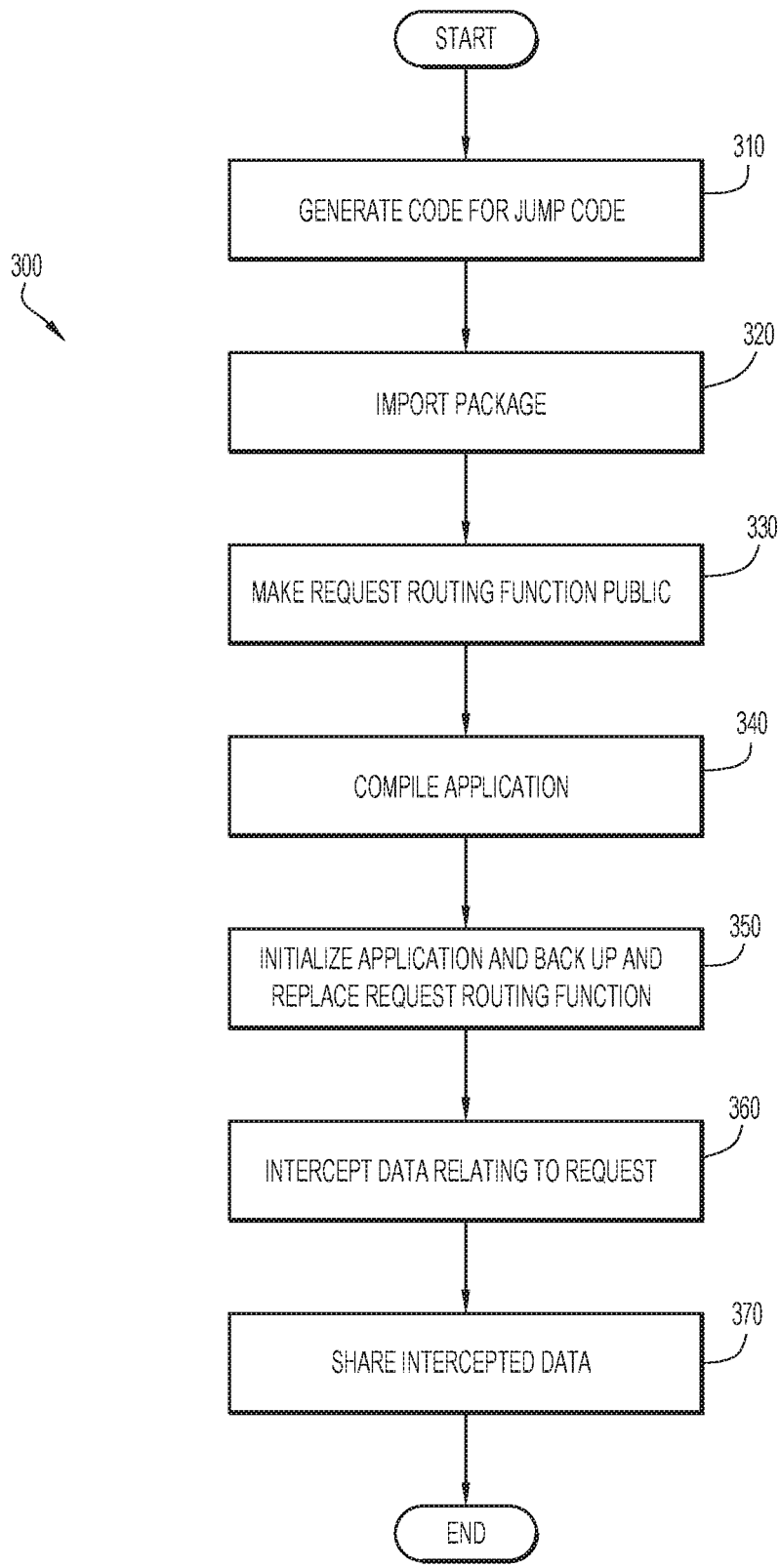
FIG. 3 is a flow chart depicting a method of monitoring performance of a compiled application in accordance with an embodiment of the present invention.

FIG. 3 is a flow chart depicting a method 300 of monitoring performance of a compiled application in accordance with an embodiment of the present invention.

Jump code is generated at operation 310. An assembly code file is created for the architecture of the target system's processor (e.g., processor 122 of application server 120). The jump code includes code (e.g., program instructions, etc.) that calls or jumps to an arbitrary function for collecting data. The jump code may be included in the library, while data collection functions and instructions to modify an application may be included in a package.

In some embodiments in which application 135 is compiled in the Go programming language, the jump code is generated by first building assembly code with a command such as "CGO_Enabled=0, GOOS=Linux GOARCH=amd64 go build" which indicates that the target architecture's operating system is Linux-based and that the processor architecture is a 64-bit processor manufactured by AMD. Next, disassembled machine code is obtained with the command "obj dump-s machine_code>machine_code.s," which outputs a disassembled machine code file. The function "GetMachineCode" is located within the machine_code.s file and the machine code of that function is obtained and added to jump code of the target system's architecture, modifying the jump code's address to include the data collection function address.

The package is imported for compilation at operation 320. Compiler 130 may import the package from an external source, such as storage 150 of library server 145. The package may be imported prior to, or during, compilation of an application, such as application 135.

The request routing function is made public at operation 330. When compiler 130 is compiling source code to generate application 135, the original request routing function is identified and converted from a private function to a public function. By converting the request routing function to a public function, the request routing function can be called by other functions that are not a parent function of the request routing function.

The application is compiled at operation 340. When compiler 130 compiles application 135, compiler 130 enables access to code from the imported package and library, including code for data collection function 220, jump code 210, and instructions to replace the original, now-public request routing function with jump code 210 and to back up the request routing function.

The application is initialized and the request routing function is backed up and replaced by jump code at operation 350. Code module 132 may back up the request routing function and insert jump code. During pre-execution of application 135, jump code 210 replaces the original request routing function, which is copied elsewhere in memory to create backup request routing function 230. In some embodiments, space is reserved by data collection function 220 for backup request routing function 230.

Data relating to a request is intercepted at operation 360. An incoming request is first received by jump code 210, which calls data collection function 220 in order to collect data relating to the request. Data collection function 220 then calls backup request routing function 230, which enables the request to be processed as intended: backup request routing function 230 routes the request to the appropriate handler (e.g., request handler 240), and a response is received. Information relating to the response is also collected by data collection function 220. Data that is collected prior to processing a request may include request metrics, such as a start time, parameters in the request, and a uniform resource locator (URL) of the request, and data that is collected after processing the request may include metrics such as an end time, status code, and the like.

The intercepted data is shared at operation 370. Intercepted data may be shared to an external application, such as data management module 137, where the intercepted data can be managed for further analysis. Analysis of intercepted data may be conducted to perform diagnostics or troubleshooting of network or computing issues, and/or intercepted data may be stored to observe performance history.

Figure 4:
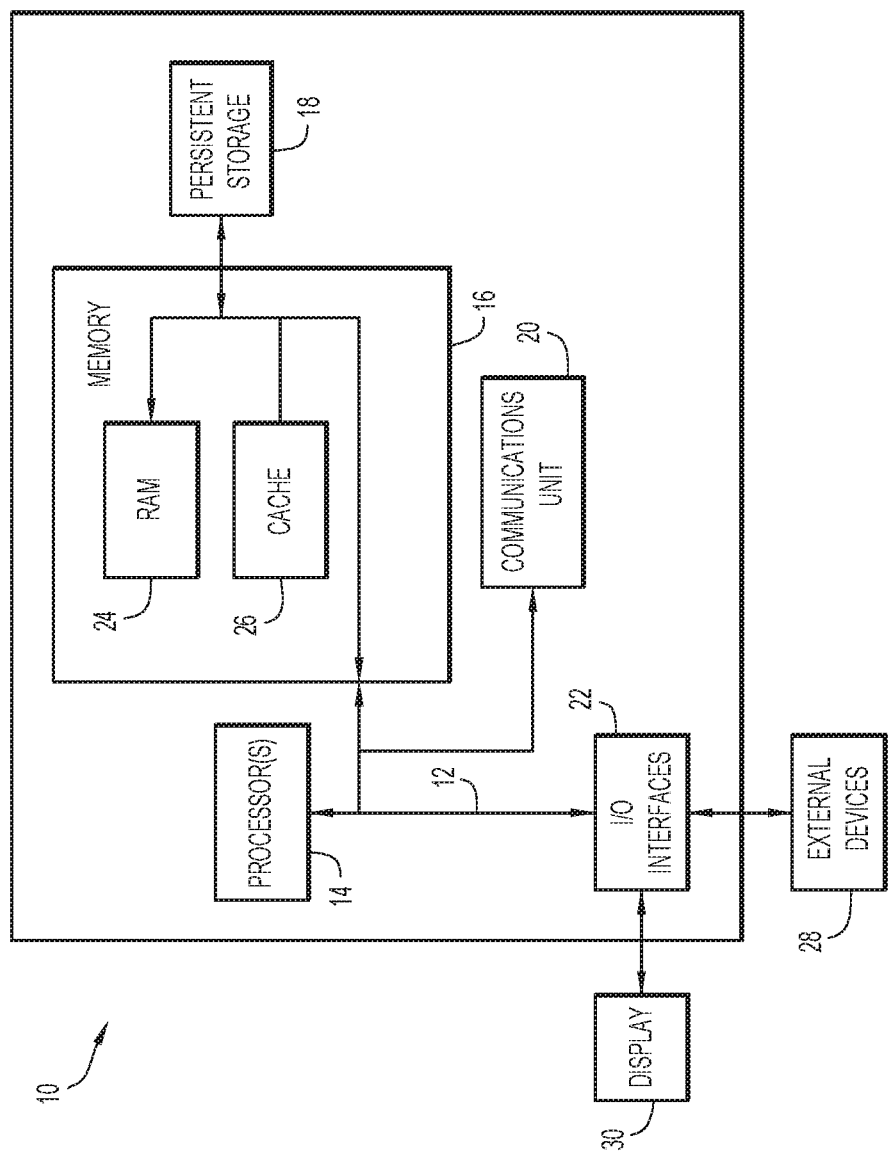
FIG. 4 is a block diagram depicting a computing device in accordance with an embodiment of the present invention.

FIG. 4 is a block diagram depicting components of a computer 10 suitable for executing the methods disclosed herein. Computer 10 may implement client device 105, application server 120, and/or library server 145 in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

Present invention embodiments advantageously enable the modification of compiled applications in an automatic manner to monitor performance. Compiled applications that may not inherently include functions for obtaining such statistics can be modified in a manner that enables performance metrics to be collected and analyzed. Furthermore, present invention embodiments do not require manual customization of code in order to modify compiled applications, enabling performance metrics to be collected from an application in an fully automated manner (e.g., by importing a package). Thus, a user is not required to manually configure the application, nor have knowledge of the programming language of the compiled application, the jump code, etc.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to modifying a compiled application to monitor performance (e.g., request and response data, packages for modifying applications, source code data, compiled application data, intercepted data, etc.) may be stored within any conventional or other data structures (e.g., files, arrays, lists, stacks, queues, records, etc.) and may be stored in any desired storage unit (e.g., database, data or other repositories, queue, etc.). The data transmitted between client device 105, application server 120, and/or library server 145 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to modifying a compiled application to monitor performance (e.g., request and response data, packages for modifying applications, source code data, compiled application data, intercepted data, etc.) may include any information provided to, or generated by, client device 105, application server 120, and/or library server 145. Data relating to modifying a compiled application to monitor performance may include any desired format and arrangement, and may include any quantity of any types of fields of any size to store any desired data. The data relating to modifying a compiled application to monitor performance may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to modifying a compiled application to monitor performance), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of modifying a compiled application to monitor performance.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client module 115, compiler 130, code module 132, application 135, data management module 137, etc.). These systems may include any types of monitors and input devices (e.g., keyboard, mouse, voice recognition, etc.) to enter and/or view information.

It is to be understood that the software (e.g., communications software, server software, client module 115, compiler 130, code module 132, application 135, data management module 137, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client module 115, compiler 130, code module 132, application 135, data management module 137, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to modifying a compiled application to monitor performance). The database system may be implemented by any number of any conventional or other databases, data stores or storage structures (e.g., files, databases, data structures, data or other repositories, etc.) to store information (e.g., data relating to modifying a compiled application to monitor performance). The database system may be included within or coupled to the server and/or client systems. The database systems and/or storage structures may be remote from or local to the computer or other processing systems, and may store any desired data (e.g., data relating to modifying a compiled application to monitor performance).

The present invention embodiments may employ any number of any type of user interface (e.g., Graphical User Interface (GUI), command-line, prompt, etc.) for obtaining or providing information (e.g., data relating to modifying a compiled application to monitor performance), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, intercepting any desired data from a compiled application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for modifying a compiled application to monitor performance, the method comprising:
    replacing, at initialization of the compiled application, a request routing function of the compiled application with jump code that directs processing to a data collection function and backing up the request routing function in memory, wherein the backup of the request routing function is converted from a private function to a public function;
    in response to receiving, during execution of the compiled application, an incoming request from a remote device for handling by the request routing function, executing the data collection function based on the jump code;
    collecting, using the data collection function, data associated with the incoming request, the data comprising performance metrics; and calling the backup of the request routing function using the data collection function to process the request and provide a response.

2. The computer-implemented method of claim 1, wherein the backup of the request routing function is inserted into a predefined function in memory.

3. The computer-implemented method of claim 1, wherein the collected data further comprises performance metrics associated with the response to the incoming request.

4. The computer-implemented method of claim 3, wherein the performance metrics comprise one or more of: latency information, traffic information, and error rate information.

5. The computer-implemented method of claim 1, further comprising: transmitting the response to the incoming request to the remote device.

6. The computer-implemented method of claim 1, wherein a package including the data collection function is imported at compilation of the application.

7. A computer system for modifying a compiled application to monitor performance, the computer system comprising:
   one or more computer processors;
   one or more computer readable storage media;
   program instructions stored on the one or more computer readable storage media for execution by at least one of the one or more computer processors, the program instructions comprising instructions to:
   replace, at initialization of the compiled application, a request routing function of the compiled application with jump code that directs processing to a data collection function and backing up the request routing function in memory, wherein the backup of the request routing function is converted from a private function to a public function;
   in response to receiving, during execution of the compiled application, an incoming request from a remote device for handling by the request routing function, execute the data collection function based on the jump code;
   collect, using the data collection function, data associated with the incoming request, the data comprising performance metrics; and
   call the backup of the request routing function using the data collection function to process the request and provide a response.

8. The computer system of claim 7, wherein the backup of the request routing function is inserted into a predefined function in memory.

9. The computer system of claim 7, wherein the collected data further comprises performance metrics associated with the response to the incoming request.

10. The computer system of claim 9, wherein the performance metrics comprise one or more of: latency information, traffic information, and error rate information.

11. The computer system of claim 7, wherein the program instructions further comprise instructions to:
   transmit the response to the incoming request to the remote device.

12. The computer system of claim 7, wherein a package including the data collection function is imported at compilation of the application.

13. A computer program product for modifying a compiled application to monitor performance, the computer program product comprising one or more computer readable storage media collectively having program instructions embodied therewith, the program instructions executable by a computer to cause the computer to:
   replace, at initialization of the compiled application, a request routing function of the compiled application with jump code that directs processing to a data collection function and backing up the request routing function in memory, wherein the backup of the request routing function is converted from a private function to a public function;
   in response to receiving, during execution of the compiled application, an incoming request from a remote device for handling by the request routing function, execute the data collection function based on the jump code;
   collect, using the data collection function, data associated with the incoming request, the data comprising performance metrics; and
   call the backup of the request routing function using the data collection function to process the request and provide a response.

14. The computer program product of claim 13, wherein the backup of the request routing function is inserted into a predefined function in memory.

15. The computer program product of claim 13, wherein the collected data further comprises performance metrics associated with the response to the incoming request.

16. The computer program product of claim 15, wherein the performance metrics comprise one or more of: latency information, traffic information, and error rate information.

17. The computer program product of claim 13, wherein the program instructions further cause the computer to:
   transmit the response to the incoming request to the remote device.

* * * * *